US006978116B2

(12) United States Patent
Burr, Jr. et al.

(10) Patent No.: US 6,978,116 B2
(45) Date of Patent: Dec. 20, 2005

(54) DIGITAL AUDIO STORE AND FORWARD SATELLITE COMMUNICATION RECEIVER EMPLOYING EXTENSIBLE, MULTI-THREADED COMMAND INTERPRETER

(75) Inventors: Charles Raymond Burr, Jr., Palm Bay, FL (US); Charles M. Nowell, Jr., Longwood, FL (US); George W. Waters, Indialantic, FL (US)

(73) Assignee: International Communications Products, Inc., West Melbourne, FL (US)

( * ) Notice: Subject to any disclaimer, the term of this patent is extended or adjusted under 35 U.S.C. 154(b) by 373 days.

(21) Appl. No.: 09/995,969

(22) Filed: Nov. 28, 2001

(65) Prior Publication Data

US 2003/0100296 A1    May 29, 2003

(51) Int. Cl.[7] ............................................. H04H 1/00
(52) U.S. Cl. .................. 455/3.02; 455/3.01; 455/3.03; 455/3.06; 342/57; 725/63; 725/67; 725/68
(58) Field of Search ............................. 455/3.01–3.06, 455/418, 419, 420, 427, 428; 342/55, 57; 725/63, 67, 68, 91; 375/216

(56) References Cited

U.S. PATENT DOCUMENTS

| 2001/0013123 A1 * | 8/2001 | Freeman et al. ............... 725/34 |
| 2002/0010936 A1 * | 1/2002 | Adam .......................... 725/91 |
| 2002/0046084 A1 * | 4/2002 | Steele et al. ................... 705/14 |
| 2002/0138852 A1 * | 9/2002 | Reynolds et al. ........... 725/136 |
| 2002/0141491 A1 * | 10/2002 | Corts et al. .................. 375/216 |

* cited by examiner

Primary Examiner—Stephen M. D'Agosta
(74) Attorney, Agent, or Firm—Allen, Dyer, Doppelt, Milbrath & Gilchrist, P.A.

(57) ABSTRACT

A store and forward receiver for a satellite communication system employs a multi-threaded command interpreter, and an associated reduced complexity audio control language (ACL) to define commands for controlling actions at different receiver sites, each of which is programmable for its own local programming purposes. Upon receipt of a relatively simple command from the headend, the interpreter accesses and executes an associated sequence of potentially locally unique, previously stored commands, causing performance of a sequence of actions, e.g., play back of potentially locally unique, previously stored information files, interleaved with portions of a headend-source commercial audio program being rebroadcast at the receiver site. This allows different affiliate stations to produce separate potentially locally unique complex sequences of actions from a single headend-sourced command for all receivers in a network grouping.

18 Claims, 9 Drawing Sheets

DIGITAL AUDIO STORE AND FORWARD SATELLITE COMMUNICATION RECEIVER EMPLOYING EXTENSIBLE, MULTI-THREADED COMMAND INTERPRETER

FIELD OF THE INVENTION

The present invention relates in general to communication systems and subsystems thereof, and is particularly directed to a new and improved store and forward receiver for a satellite communication system, whose supervisory control processor contains an extensible, multi-threaded command interpreter. Upon receipt of a single, reduced complexity command from a headend (audio programming) transmitter, the command interpreter accesses and conditionally executes a sequence of commands (which may be in the form of a script file) stored in an attendant storage unit. Execution of the command sequence causes performance of a plurality of associated actions, such as, but not limited to, play back of previously stored information files interleaved with portions of a headend-source commercial audio program stream being rebroadcast at the receiver site, so as to provide for the professional sounding insertion of potentially locally unique recorded material with the real-time rebroadcast audio stream.

BACKGROUND OF THE INVENTION

A growing number of (commercial) communication systems, such as those providing audio programming, including but not limited to music, educational, sports, etc., program material, are being implemented as satellite link-based, store and forward digital audio broadcast systems. In this type of system, the general architecture of which is diagrammatically illustrated in FIG. 1, real-time digital audio program material is broadcast from a network headend facility 10 over a satellite communication link 20 to a number of geographically dispersed users (such as affiliate radio stations) 30. As it is being received, this headend-sourced program audio material is immediately rebroadcast to an associated local station audience, as through conventional radio broadcast transmission equipment, and the like.

Concurrent with the real-time satellite transmission of the to-be-rebroadcast program material, additionally unique information (e.g. local commercials, specific station identifiers, delayed programming, etc.) may be downloaded from the headend station to its affiliate radio station receivers and stored in a local digital storage device (e.g. hard disk drive, solid state flash memory, and the like) for later use by the affiliate station. In addition, from time-to-time, the headend may forward (or the operator of the local station may generate) commands, that are used to trigger the performance of one or more functions, such as but not limited to, recording the real-time broadcast digital audio stream, operating audio mixers, managing the digital storage media, initiating relay switch closures, playing back previously stored material, forwarding stored files to the local network, etc. When stored material is to be played back, it may be inserted or interleaved with or overlaid on the real-time programming or forwarded to an external device as the radio station.

For this purpose, the network headend facility 10 typically comprises a digital audio encoder 11, which is operative to encode or convert real-time audio content into a prescribed digitally encoded format (such as motion picture expert group (MPEG) format) for transmission over the satellite link. The encoded real-time digital audio stream produced by encoder 11 is coupled as one input to a multiplexer 12, the aggregate digital output of which is applied to a modulator 13 for application to a transmitter 14 and transmission thereby over the satellite link 20 to various store and forward receiver stations 30. Additional inputs to the multiplexer 12 may include a real-time control channel from a network automation system (which will from time-to-time issue commands to affiliate stations to perform various actions), a user data channel, audio files supplied from an audio file server 14, as well as digital information supplied from one or more other sources (not shown).

The equipment employed at a respective affiliate radio station 30 is comprised principally of a receiving satellite antenna subsystem 31, the output of which is coupled to a store and forward receiver 32. In its most basic application, the receiver may output received audio programming directly to an attendant rebroadcasting unit 33, such as one containing conventional radio broadcast transmission equipment, and the like, for real-time rebroadcast of the audio programming, as it is received from the headend to an associated local station audience. In addition, the receiver may be connected to an automation system, which may accept signaling inputs from or provide signal outputs to the receiver. Also, the receiver may be connected to a local area network (LAN) for transferring audio files to various users served by the station.

For the most part, the intended operation of the satellite link-based store and forward system of the type shown in FIG. 1 has the receiver sites 30 controlled by the automation network headend facility 10. A typical operation to be performed by a receiver is to implement a station break, which customarily requires the execution of a prescribed sequence of events. As a non-limiting example, to implement a sixty second station break having two commercial messages or 'spots' and a station identification (ID) message, the following actions may be performed:

Momentarily close a relay to signal the beginning of the station break;

Maintain another relay closed during the break;

Transition the input to an audio mixer from the real-time feed from the headend to the output of a decoder through which previously recorded or stored (station break) material is played back;

Maintain the audio mixer's settings for the decoder feed for a prescribed time interval;

Play back a locally unique file (e.g., a ten second recorded file) containing the specific local station ID;

Play back a commercial spot (e.g. a thirty second recorded file);

Play back a 'liner' for the network (e.g. a twenty second recorded file); and

Transition the input to an audio mixer from the output of a decoder back to the real-time feed from the headend.

Now although the each of the eight actions listed above for a typical sixty second station break is a relatively simple function, it is imperative that they be executed with a very high degree of timing accuracy, in order to ensure that they be perceived to the listener as occurring instantaneously (without delay). If not, for example if there were a two second delay between successive file playbacks, the effect would be very noticeable to the listening audience and be perceived as a non-professional sound to the station's programming. Furthermore, the insertion of locally unique material must be seamless such that the local station appears to be locally produced with live sounding local "on air" personalities.

Associated with this delay problem in an individual receiver is the probability that different receivers in the network will be simultaneously performing different functions (e.g. playing different files). Yet, all receivers must be able to perform their operations with perceptually no delay, irrespective of the number of different actions being performed. Namely, all actions must be performed with minimal delay or timing uncertainty.

In addition to the likelihood that different receivers will be simultaneously performing different functions, there is also the requirement that different receivers perform different actions, so as to allow affiliate stations to insert files whose content is appropriate to their locality, time zone, audience, etc. This enables a network affiliate station to target commercials and other content to that station's listening audience at the appropriate time, but still rebroadcast the network programming. In order to accomplish this, the system must implement some form of group addressing for download content as well as for commands. Examples of groups include time zones, states, FM stations vs. AM stations, rural areas vs. suburbs, etc. Receivers must also be capable of belonging to multiple groups.

In the course of satisfying the criticality of the timing of such command-response actions being performed by the receiver (which take place only occasionally), it is undesirable to employ more than a relatively small amount of the available bandwidth to command these operations, in order to avoid an unacceptably high system overhead cost. Moreover, as pointed out above, in some instances, it may be desired that the local affiliate station, rather than the headend, generate the commands for receiver operation. As a non-limiting example, the playback of a local weather report from a predetermined audio output port of the receiver may be triggered by the station operator activation of a push-button switch. Another example would be for the affiliate station to record a live newscast sourced from the headend for later broadcast.

SUMMARY OF THE INVENTION

In accordance with the present invention, these objectives are achieved by a store and forward satellite receiver architecture, that is controlled by a multi-threaded command interpreter. The command interpreter responds to one or more, bandwidth-conserving commands issued to respectively different receiver sites, to access and cause the execution of a sequence of (script file-based) commands stored in an attendant digital file storage unit. The commands are associated with the performance of programmable sequences of actions, such as, but not limited to, the playing back of previously digitally recorded audio files, recording of real-time audio feeds, operating relays, and controlling audio mixers to provide for the professional sounding insertion of recorded material into a real-time rebroadcast audio stream.

The commands may invoke other commands, which may have been previously defined and customized for each receiver or receiver grouping. These commands may also initiate the execution of other commands stored in files on the local hard disk, whose content varies from receiver to receiver. In this manner, the receiver provides network-wide synchronization of local programming and advertising insertion, which may be customized for each individual receiver or receiver grouping.

The invention provides for the timing of these operations to be very accurately controlled, so as to be perceived by a listener as taking place instantaneously. In addition to being controlled by a single headend-sourced command, the receiver may be controlled in a number of alternative ways, including locally by the affiliate station, in response to triggers embedded in recorded files, by relay closures, and by auxiliary external commands.

In addition, the commands may modify the command interpreter itself, such that the receiver or receiver groups behave in a new way, based upon the modifications made to the interpreter. The command set to which the receiver responds is extensible during operation. The total command set, including its extensibility, is extended to the head-end interface, a back panel user interface and to internal interfaces. The head-end interface is used to operate a network. The extensibility of the command set allows the receiver to be customized for each receiver site, for example, including but not limited to, customization of the manner in which the receiver responds to the customer's relay closure equipment, program selection, relay output configuration, etc.

The receiver's satellite link antenna feeds a demodulator, which recovers the aggregate baseband signal from the headend. The aggregate signal may include one or more real-time (MPEG) encoded program (digital audio) signals, a real-time digital control channel, digital file downloads, and a network digital control channel. The baseband signal is demultiplexed into respective components for application to receiver subsystem components, including a real time digital audio path to a digital audio stream router, to a command processor (containing the interpreter) and to one or more user data interfaces. The real-time control channel is used exclusively for audio control language (ACL) commands, in order to avoid contention with other data. The network control channel is used to control receiver configuration parameters.

Demultiplexed real-time digital audio program signals are applied to a first digital audio decoder, the analog output of which is fed through an output buffer amplifier to the affiliate radio station's rebroadcasting equipment. The audio programming is also coupled to an audio mixer, the output of which is coupled through a 'mixed' analog output buffer amplifier to the rebroadcasting equipment. The combining action of the audio mixer is controlled by ACL command signals from the command processor to selectively mix (decoded digital) audio signals and a locally supplied analog audio signal, and provides a relatively 'clean' mixed audio signal ready for broadcast by the affiliate's transmission equipment.

The audio decoder is also coupled to the digital audio stream router, which receives the real-time digital audio stream from the demultiplexer as well as a (prerecorded) digital audio stream, such as a commercial or station ID 'spot', read out from a digital storage unit. The router can route either a real-time digital audio stream (e.g., digital audio programming being received from the network headend), or digital audio that has been previously stored in the auxiliary digital storage unit, to associated decoders for application to selected output ports feeding the affiliate station broadcast equipment. The digital audio stream router is coupled to an auxiliary decoder, the decoded (analog) audio output of which is coupled to the audio mixer.

A network interface is coupled between the command processor and a local area network and serves to provide for the transfer of network data files to and from the receiver. This provides an alternative mechanism for transferring stored files to local servers, or for allowing files stored in the receiver's storage unit to be injected into the mixed audio output from the audio mixer. A remote command interface allows real-time control signals to be interfaced between the command processor and a remote control subsystem. A relay closure interface unit is coupled to the command processor to supply control signals to, and sense state signals from, remote relay devices.

The supervisory control mechanism employed by the receiver's command processor comprises a multi-path/threaded 'command interpreter'. The command interpreter suspends until an input source has input available. When a complete command buffer is received, the interpreter parses the commands and executes them. Each executable command performs logic or invokes an action to affect receiver behavior. The action commands are dispersed to various other logical software units via input queueing mechanisms. Each queue terminates in a stand-alone functional unit (task or thread) that performs the given actions at the designated time with the designated parameters. The command interpreter is non-blocking, so that once it has interpreted a command and produces directed actions therefor, it may immediately act upon the next command without waiting for completion of a previously processed input command. Also, different commands are allowed on each queue/path/thread, so that different users have different functions available to them.

Because the command interpreter does not wait for output functions to be completed, it provides perceptibly instantaneous execution of the polled or received input commands. This allows a set of commands that define a complex sequence of actions (such as a one minute long, multi-message station break) to be processed immediately, and its associated output actions delivered to the appropriate output process engine queues. This is essential, for example, when the receiver is receiving a command to perform a given action (such as playing back an audio file) on one program output, while at the same time receiving a local command to perform another action (such as playing back a previously recorded file to another audio output).

The provision of a respective first-ins first-out buffer or FIFO in each input command path to the interpreter allows several commands to be received and acted upon, as the command interpreter polls the input command buffers and processes the commands in the order received from multiple users. Since the command interpreter is considerably faster than the rate at which commands are received, commands are effectively processed immediately (i.e. the listener's perception is that all events occur simultaneously, with no effective latency).

Input commands to the command interpreter include real-time control channel commands demultiplexed from the aggregate data stream from the network headend, previously stored commands from a file read out of the digital storage unit, local user commands from the remote interface, local relay closure signals sensed via the relay interface, and commands from the local area network interface. On the output side, the command interpreter is coupled to output queues that feed associated decoded audio 'play' engines for playing stored digital audio files to the decoders. A play engine comprises a virtual machine which retrieves digital audio files stored in the digital storage unit and provides them to the audio decoders for delivery to an audio output port or controlled insertion or interleaving with the received real-time audio stream being received from the network headend.

The command interpreter is further coupled to one or more output queues that feed associated decoded 'audio mixer' engines for mixing audio files. As described above, the audio mixer provides for the controlled mixing of multiple audio sources (including the real-time audio stream from the headend, a played back audio feed extracted from the storage unit, and a local audio feed. This allows a mixed audio output to be used for complex actions, including 'spot' insertions, fades, voice-overs, and the like.

A further output of the command interpreter is coupled to one or more output queues for associated decoded 'relay' engines used to operate relays for initiating local actions at the affiliate station. As a non-limiting example, the operation of a relay may be used to indicate to the local station that a network cut-away has been executed, so that the local station may insert its own local content into the 'on-air' program. Relay commands may include opening, closing or pulsing a relay (closed) for a programmable time interval (after which the relay reopens).

The command interpreter is also coupled to one or more output queues that feed associated decoded 'record' engines for recording digital audio streams, as the audio is being received in real-time from the network headend. This engine provides the affiliate station with the ability to record a short newscast or a complete program for broadcast at a later time. The command interpreter may be additionally coupled to one or more output queues feeding auxiliary engines associated with additional interfaces, such as the network interface and the remote command interface.

Commands for controlling the operations of the store and forward receiver are defined in accordance with a reduced complexity, direct threaded programming language, that uses post-fix notation, referred to herein as audio control language (ACT-L). ACL enables the command interpreter to initiate a download and store a file, termed a script, containing ACL commands. Scripts allow several commands to be combined into a complex sequence of events, which require only a single, relatively short (e.g., 'load') command to trigger these sequences. Scripts are downloaded from the demultiplexed aggregate baseband signal by the command processor and stored in the digital storage unit for subsequent use. When the load script command is received, the command interpreter opens the appropriate script file and loads its contents into an input command FIFO. The commands are then executed as though received from any other source of ACL commands. Scripts also enable different receivers to perform different actions from a single trigger (load) command.

When an incoming MPEG stream is recorded by the receiver its associated ACL commands are also recorded and embedded in the resulting stored file. When a file is to be accessed and played back from the digital storage unit, any embedded ACL commands are extracted from the file and forwarded via the file storage input buffer to the command interpreter. This allows the program to be recorded along with its associated commands and have the commands executed at the appropriate time relative to the program being played. The result of this process is the ability to record a radio program, together with station breaks, as it is being broadcast, and then replay the assembled program at a later time.

DETAILED DESCRIPTION

Figure 1:
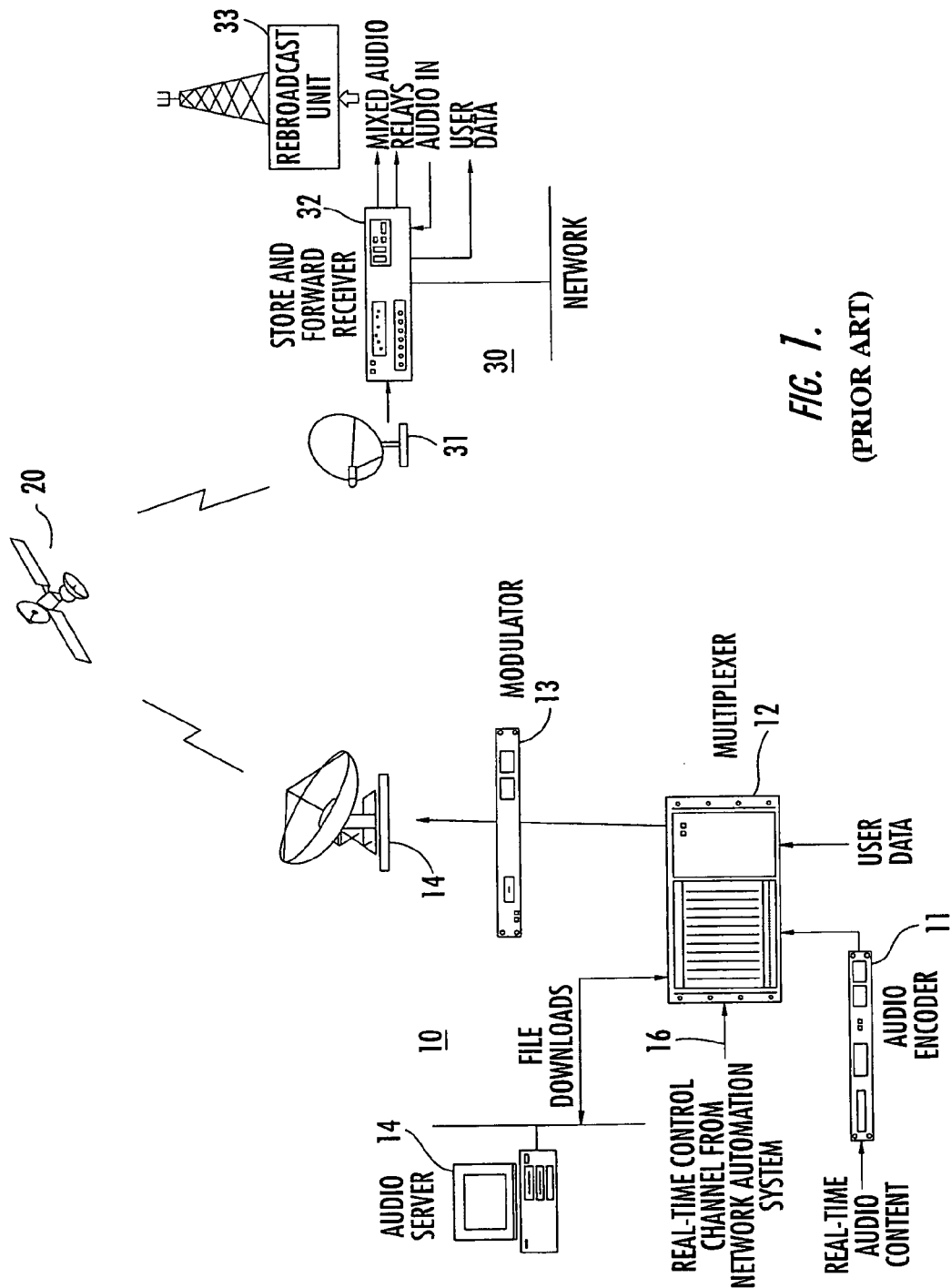
FIG. 1 diagrammatically illustrates a satellite link-based, store and forward digital audio broadcast system.

Before detailing the store and forward receiver architecture of the present invention, it should be observed that the invention resides primarily in an arrangement of conventional communication circuits and associated digital signal processing components and attendant supervisory control circuitry, that controls the operations of such circuits and components. Consequently, the configuration of these circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show its major components in a convenient functional grouping, whereby the present invention may be more readily understood.

Figure 2:
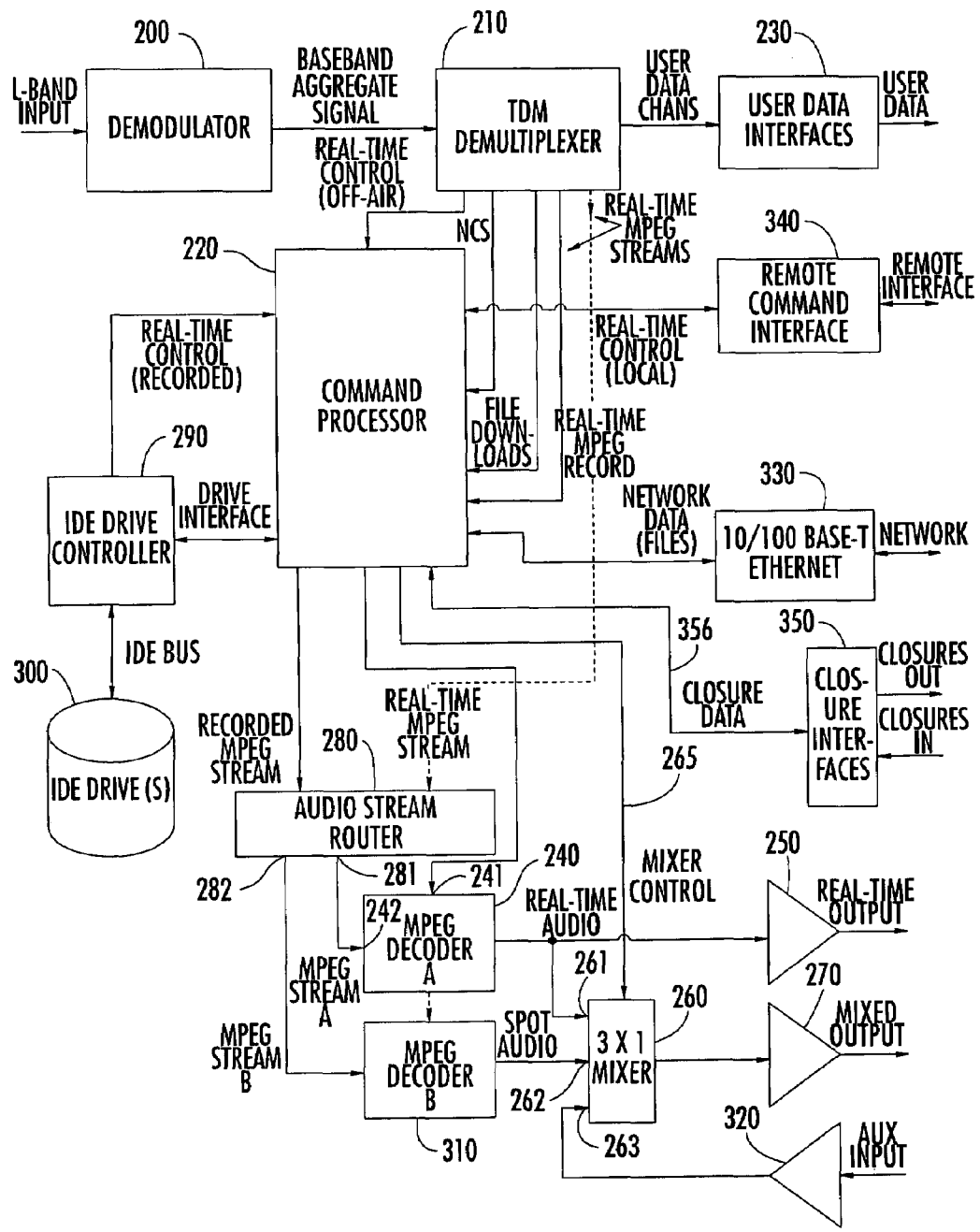
FIG. 2 diagrammatically illustrates the overall architecture of a store and forward receiver in accordance with the present invention.

Attention is now directed to FIG. 2, which diagrammatically illustrates the overall architecture of a store and forward receiver in accordance with the present invention. As shown therein a demodulator 200 is coupled to receive the signal being supplied by the receiver's satellite link antenna and recovers the desired aggregate baseband signal from the modulated input. As a non-limiting example, the received (downlink) signal may comprise an L-band signal (in a frequency range of from 950 to 1450 MHz). The recovered baseband signal, which is typically a time division multiplexed (TDM) signal (but may alternatively comprise a single channel per carrier (SCPC) packet-multiplexed signal) containing the aggregate data transmitted from the network headend, is coupled from the demodulator 200 to a demultiplexer 210.

Demultiplexer 210 demultiplexes the aggregate baseband signal into its respective components for application to receiver subsystem components. These include a real time digital audio path to a digital audio stream router 280, and paths to a command processor 220 and user data interfaces 230. As described above, the aggregate baseband digital signal may include one or more real-time (MPEG) encoded program (digital audio) signals, a real-time digital control channel, digital file downloads, and a network digital control channel, which are coupled to command processor 220.

The real-time control channel, which may have a data rate on the order of 38.4 kbps, as a non-limiting example, is dedicated only to the transmission of audio control language (ACL) commands, so that there will be no delay in this channel due to contention with other data. The network control channel is used to control receiver configuration parameters, such as operational frequencies, data rates and other parameters associated with the real-time operation of the receiver. The aggregate baseband signal may also include one or more user data channels, which are coupled directly to associated user data interfaces 230.

The command processor 220 contains an extensible, multi-threaded command interpreter (shown in FIG. 3 to be described) that is coupled to receive command inputs from a variety of sources including headend-sourced commands, stored commands, local affiliate external inputs, or those sourced from a local area network. Each source of command input is provided a unique command "context" with potentially different sets of commands or different actions for identically named commands. Each context provides locally unique behavior for identical low bandwidth commands which initiate actions. Execution of these various commands causes the performance of a sequence of actions, such as, but not limited to, the play back of previously stored information files, that may be interleaved with portions of a headend-source commercial audio program being rebroadcast at the receiver site, or output directly to an affiliate station port.

Demultiplexed real-time digital audio program signals are coupled to the command processor 220 and also, via the audio stream router 280, to the input of a real-time MPEG digital audio decoder 240, the decoded analog output of which is coupled to an output buffer amplifier 250 for application to the affiliate radio station's rebroadcasting equipment. The analog output of the MPEG decoder 240 is also coupled to a first input 261 of a 3×1 audio mixer 260, the output of which is coupled to an 'mixed' analog output buffer amplifier 270, which also feeds the affiliate station's rebroadcasting equipment. The audio mixer 260 provides for the selective mixing of decoded audio signals and a locally supplied external analog audio signal. The operation of the audio mixer 260 is controlled by ACL command signals supplied over link 265 from the command processor 220. This enables the audio mixer 260 to readily provide a relatively 'clean' mixed audio signal that is ready for broadcast by the affiliate's transmission equipment.

A first input 241 of the MPEG digital audio decoder 240 provides a path from the command processor for monitor and control signals to and from the MPEG digital audio decoders 240 and 310. This path can also be used to recover ancillary data from the MPEG digital audio decoders 240 and 310 for possible use by the command processor 220.

The MPEG decoder 240 has a second input 242 coupled to a first output 281 of the digital audio stream router 280, which is coupled to receive a real-time MPEG digital audio stream from the demultiplexer 210, as described above, as well as a (pre-recorded) digital audio stream (such as a commercial or station ID 'spot', which is read out via a digital storage unit drive controller 290 under the control of the command processor 220 from a digital storage unit 300. The digital audio stream router 280 provides the ability to route either a real-time digital audio stream (e.g., digital audio programming) being received from the network headend, or a digital audio stream that has been previously stored in the auxiliary digital storage unit 300, to associated (MPEG) decoders 240, 310 and for application to selected output ports feeding the affiliate station broadcast equipment. A second output 282 of the digital audio stream router 280 is coupled to an auxiliary MPEG decoder 310, the decoded (analog) audio output of which is coupled to a second input 262 of the 3×1 audio mixer 260. A third input 263 of the audio mixer 260 is coupled to receive an auxiliary audio input supplied by way of an input buffer amplifier 320.

A network interface 330 is coupled between the command processor 220 and a local area network and serves to provide for the transfer of network data files to and from the receiver. This provides an alternative mechanism for transferring stored files to local servers, or to allow files stored in the receiver's storage unit 300 to be injected into the mixed audio output from audio mixer 260.

Audio and script files may be stored in a number of ways. In accordance with a non-limiting but preferred implementation illustrated in FIG. 2, storage unit 300 may contain standard computer IDE drives, including either hard disk, or flash memory devices utilizing solid state flash memory devices configured to be compliant with the specifications of the IDE computer standard. Employing IDE drives allows the use of standard computer file systems. As a non-limiting example, the file system may comprise an industry standard, DOS-based FAT 16 file system, which provides for the naming and management of the files stored on the (computer hard) drive.

Also shown in FIG. 2 is a remote command interface 340, through which real-time control signals (ACL) may be interfaced between the command processor and a remote control subsystem. To provide for supplying control signals to and sensing state signals from remote relay devices, a relay closure interface unit 350 (having a closure signal output port and a closure sensing input port) is coupled to the command processor 220 via a relay closure data link 356.

Figure 3:
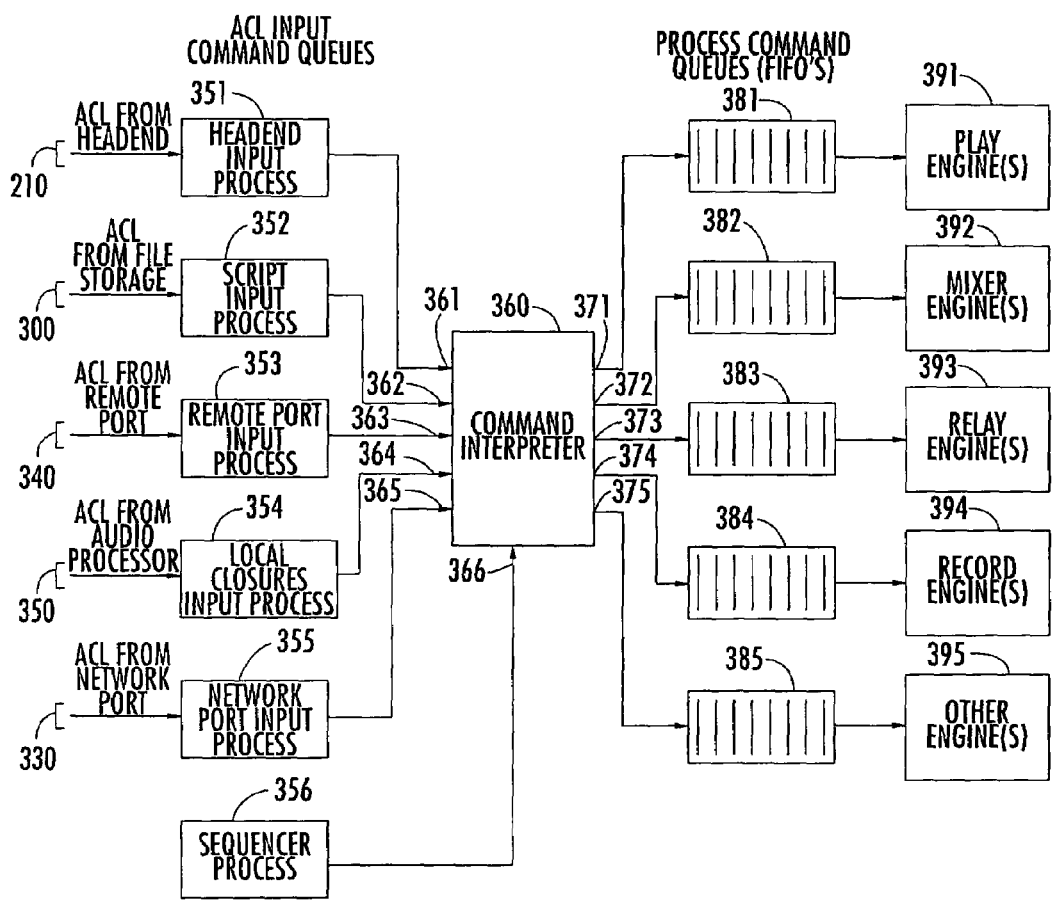
FIG. 3 shows the functional architecture of the supervisory receiver operation control mechanism executed by the command processor of the receiver of FIG. 2.

Referring now to FIG. 3, the functional architecture of the supervisory receiver operation control mechanism executed by the command processor 220 of the receiver diagram of FIG. 2 is shown as comprising a multi-path or multi-threaded 'command interpreter' routine 360, that is coupled to receive inputs from a variety of 'upstream' sources and to supply operational control outputs to various 'downstream' or output drive engines. The command interpreter may be non-blocking, so that once a command is interpreted, and its directed actions produced, the command interpreter may immediately act upon the next command without waiting for completion of a previously processed input command. Also, different commands are allowed on each thread, so that different users have different functions available to them. As will be described, the command interpreter 360 scans input command buffers for the presence of an input command, parses the commands queued therein into appropriate output execution signals and associated parameters, and then immediately writes the parsed commands into output queues for delivery to downstream output functions or 'virtual output process engines' of the receiver. The command interpreter and execution "engines" coexist as execution threads under the control of a real time operating system. As such, the "engines" operate as required, when commands become available to them or data is made available by the command subsystem for which that engine has control (e.g., disk drive, output port, etc.).

As noted above, the command interpreter 360 does not wait for the output functions to be completed, and thereby provides perceptibly instantaneous execution of the polled input commands. This allows a set of commands that define a potentially locally unique (but still satisfying the timing requirements of the local "break") complex sequence of actions (such as the sixty-second station break example, described previously) to be processed quickly, and its associated output actions coupled to the appropriate output process engine queues. This is essential, for example, when the receiver is receiving a command to perform a given action (such as play an audio file) on one program output, while at the same time receiving a local command to perform another action (such as play back a previously recorded file to another audio output).

The provision of a respective serial, first-in, first-out buffer or FIFO in each input command path allows several commands to be received and acted upon, as the command interpreter scans or polls the buffers and processes the commands in the order received from multiple users. Since the command interpreter is considerably faster than the rate at which commands are received, commands are processed immediately (with no effective latency).

In the architecture of FIG. 3, input commands to the command interpreter 360 include the real-time control channel commands demultiplexed from the aggregate data stream from the network headend by demultiplexer 210, and applied via a first, headend input process queue or serial buffer 351 to a first input port 361. They also include previously stored commands applied via a second, script input process buffer 352 to a second input port 362 from a file read out of the storage unit 300, and local user commands from the remote interface 340 applied via a third, remote port input process queue 353 to a third input port 363. Local relay closure signals as sensed via relay interface 350 are coupled via a fourth, local (relay) closures input queue 354 to a fourth input port 364, while commands from the local area network interface 330 are coupled via a fifth, network port input process FIFO 355 to a fifth input port 365. A sixth input process is the sequencer function 356 coupled to a sixth input 366 of the interpreter. This process manages the sequencing of the interpreter through the various input processes.

On the output side, the command interpreter 360 has a first output port 371 coupled to one or more output queues (serial buffers or FIFOs) 381 that feed one or more associated decoded audio 'play' engines 391 associated with the playing of stored digital audio files for application to the MPEG decoders 240 and 310, described above. Namely, a play engine comprises a virtual machine which retrieves digital audio files stored in the digital storage unit 300 and provides them to the audio decoders for delivery to an audio output port for controlled insertion or interleaving with the received real-time audio stream being received from the network headend.

A second output port 372 is coupled to one or more output queues 382 that feed one or more associated decoded 'audio mixer' engines 392 associated with the mixing of audio files by 3×1 mixer 260 for application to the mixer output buffer 270. As described above, the mixer 260 provides for the controlled mixing of three audio sources (the real-time audio feed as decoded by MPEG decoder 240, a played back audio feed extracted via the command processor 220 from the storage unit 300, and a local audio feed supplied by way of the auxiliary input buffer 320). This allows a mixed audio output to used for complex actions, including 'spot' insertions, fades, voice-overs, and the like.

A third output port 373 is coupled to one or more output queues 383 that feed one or more associated decoded 'relay' engines 393 associated with the selective operation of relays used to initiate local actions at the affiliate station. The signal output path of this engine is coupled via link 356 to the relay closure interface 350. As a non-limiting example, the operation of a relay may be used to indicate to the local station that a network cut-away has been executed, so that the local station may insert its own local content into the 'on-air' program. Relay commands may include opening, closing or pulsing a relay (closed) for a programmable time interval (after which the relay reopens).

A fourth output port 374 is coupled to one or more output queues 384 that feed one or more associated decoded 'record' engines 394 associated with the controllable recording of digital audio streams as the audio is being received in real-time from the network headend. For example, this engine provides the affiliate station with the ability to record a short newscast or a complete program for broadcast at a later time. The end result of the record process is a digital audio file that is written into the digital storage unit 300 via drive controller 290, as described above, and may be treated as any other stored file.

A fifth output port 375 of the command interpreter is coupled to one or more output queues 385 that feed one or more auxiliary engines 395 associated with additional interfaces, such as the network interface 330 and the remote command interface 340. As described above, the network interface 330 may be used to transfer network data files to and from the receiver via a local area network. It also enables files stored in the storage unit 300 to be injected into the mixed audio output from the audio mixer 260. The remote command interface unit 340 allows real-time control signals to be interfaced between the command processor 220 and a remote control subsystem.

As described above, pursuant to a non-limiting but preferred embodiment the present invention generates commands for controlling the operations of the store and forward receiver, including those described above, in accordance with a reduced complexity programming language, referred to herein as audio control language (ACL). More particularly, ACL is a direct threaded programming language that uses post-fix notation.

In accordance with the ACL structure, tokens or symbols within a string are delimited by spaces. Tokens may be either commands or parameters. The command processor is loaded with a token dictionary containing the functions necessary to operate the receiver. If the command interpreter encounters a token that is not in the dictionary, that token is treated as a numerical value (which may be encoded as thirty-two bit integers). The numbers are placed on the data stack (which is used for arithmetic and logic.

The command interpreter takes in a line of input code at a time, although a sequence of tokens may span more than one line. The end of line character (carriage return or newline) is treated as a space, so that no token may span a line boundary. Post-fix notation is employed for arithmetic and logic. All commands operate on the top item in the stack (or the two top items for binary operators). Numerical values are primarily used as parameters to commands. Logical values are used primarily to allow or disallow the execution of commands, based upon affiliate grouping. Logical values are either zero (0) or FALSE, or non-zero or TRUE.

ACL provides the receiver with the ability to download and store a file, termed a script, containing ACL commands. Scripts provide a mechanism for combining several commands to form a complex sequence of events, yet only require a short command to trigger these sequences. Scripts are downloaded from the demultiplexed aggregate baseband signal by the command processor and stored in the digital storage unit 300 for subsequent use.

A script is triggered by sending a 'load' command. The load command contains only a script file name. When the load script command is received, the command interpreter of FIG. 3 opens the appropriate script file and loads the contents of the file into a command FIFO. The commands are then executed as though received from any other source of ACL commands. Scripts also enable different receivers to perform different actions from a single trigger (load) command.

As a non-limiting example, it may be desired for the network to have a 'top-of-the-hour' station break, which is different at all stations. In this example, the script is downloaded to each station, and tailored for that individual station. It may also include a different sequence of station ID and commercial breaks at each station. When the script is loaded by the headend at the top of the hour, each receiver retrieves the contents of its script and couples it to the appropriate input buffer of the command processor architecture of FIG. 3. Each station's command interpreter then performs the appropriate actions for that station.

As described above (ACL) commands may also be included in a stored audio file in the digital storage unit 300. When a file is to be played back from the digital storage unit 300, the ACL commands are extracted from the file and forwarded to the tile storage input buffer to the command interpreter. This allows the program to be recorded along with its associated commands and have the commands execute at the appropriate time relative to the program being played. The result of this process is the ability to record a radio program, together with station breaks, as it is being broadcast, and then to replay it replayed at a later time with those same station breaks. For example, the delay may be a few minutes, so that a live program may be shifted, or it may be stored for a long period of time, and then rebroadcast at a time convenient to the affiliated radio station.

Figure 4:
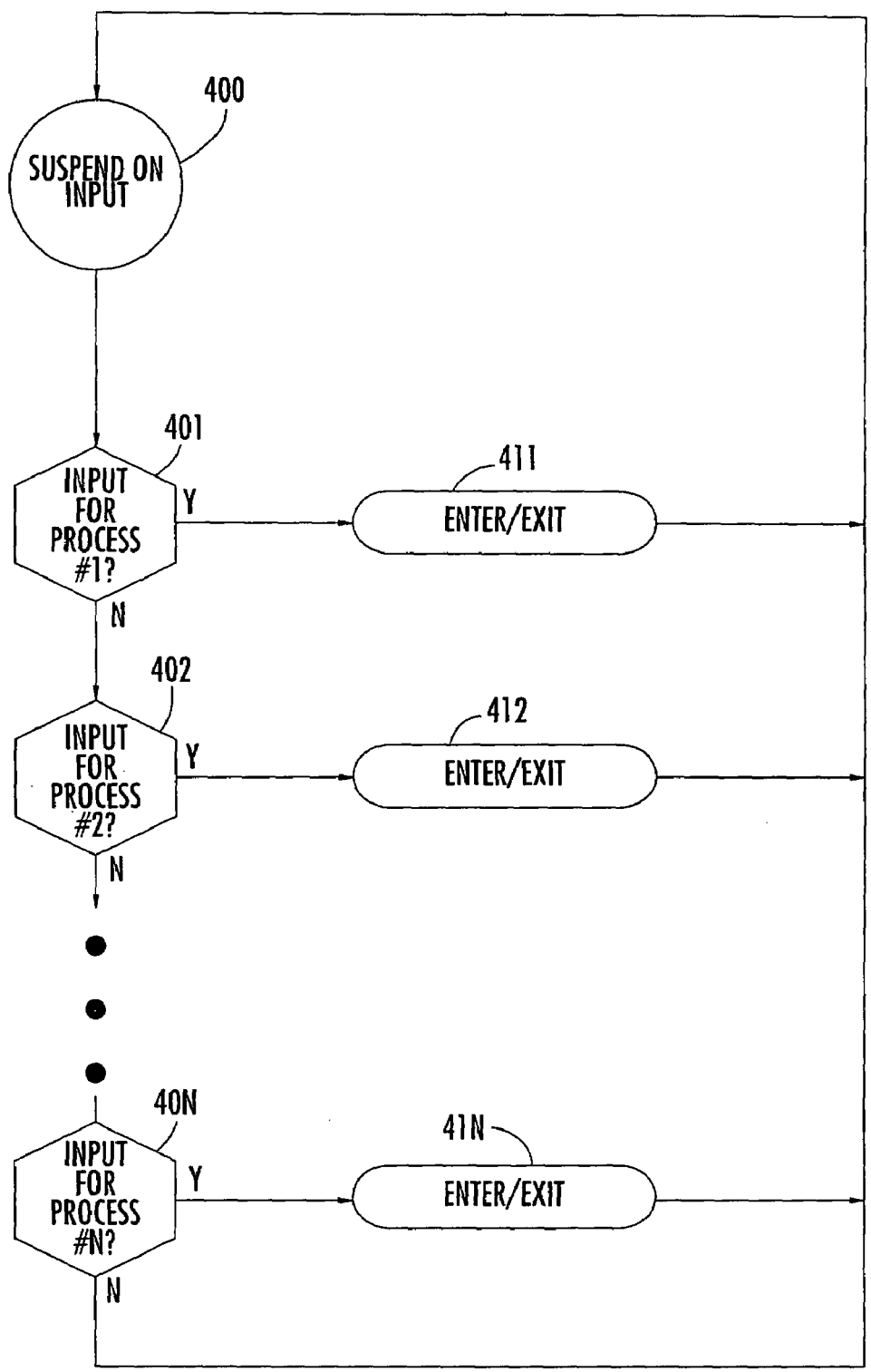
FIG. 4 is a flow chart of the outer routine and dispatcher employed by the command interpreter to execute input commands.

FIG. 4 is a flow chart of the outer routine and dispatcher employed by the command interpreter to execute input commands. Transitioning from a suspend-on-input state 400, a first input of a process being polled by the interpreter (such as that associated with the headend input process) in a first query step 401 inquires whether there is an input for that process. If the answer to query step 401 is YES, the routine transitions to step 411, to execute the corresponding command, and then returns to state 400. If the answer to query step 401 is NO, the routine transitions to the query step for the next process and proceeds as described above. The routine proceeds in this manner for all processes. This iterative handling of the processes insures that a respective input will be acted upon in the order it was received. It also insures that as soon as any process is completed, the dispatch operation will return to its standby state, awaiting inputs from another source.

Figure 5:
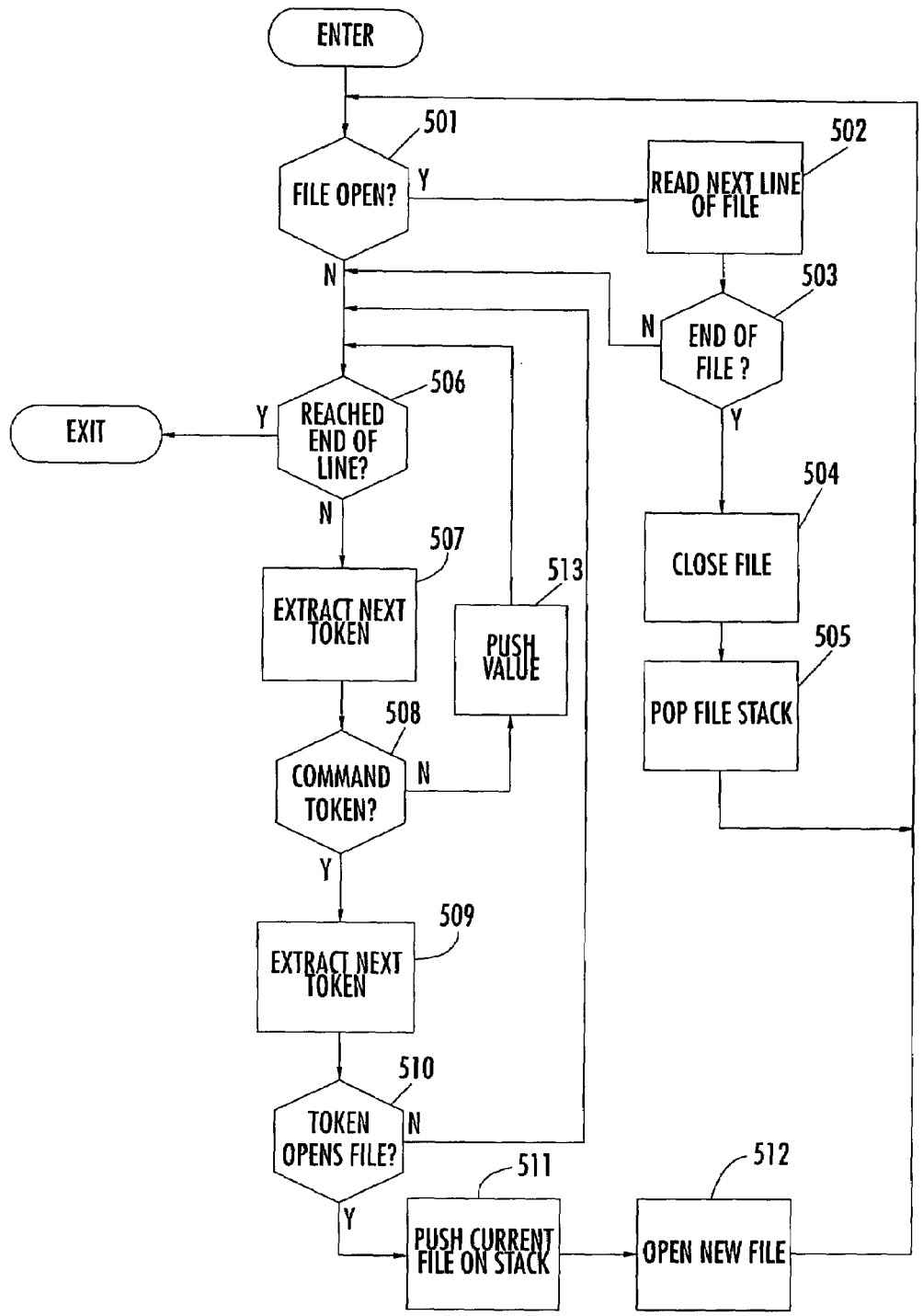
FIG. 5 is a flow chart of a typical routine employed by the command interpreter to execute various engines shown in FIG. 3.

FIG. 5 is a flow chart of one of many user processes (e.g., head-end, back-panel, etc.) employed by the command interpreter to accept, parse and execute various interpreter commands ("tokens"), assemble parameters and perform conditional logic and to dispatch the appropriate commands and parameters to various engines shown in FIG. 3, detailed flow charts for which are shown in FIGS. 6–9, to be described.

The result of the input process is usually a command to perform some resulting action and the parameters to be used in performing that action. This command is passed on to the output process and the input process returns to the dispatcher. Several input processes may be active at any time and will be in different states. Since command outputs are passed on to the output processes, the input process does not have to wait for the output processes to finish executing.

Different input processes may employ different command sets (word lists), so that different users can access different command sets. This allows tailoring the types of actions to be performed by each user. ACL provides the ability to compile new commands/words into the command set/list. The definition of a new word or command may consist of any of the possible actions to be performed by the command interpreter. Once a new word is defined, it remains in the dictionary, until removed by invoking prescribed (delete/forget) commands.

Referring now to FIG. 5, at query step 501, the routine inquires whether this user process context is currently retrieving commands from a file. If this process is reading a file, the routine transitions to step 502, wherein an attempt is made to read another line of text for processing. If the attempt succeeds, the routine proceeds to step 506. If the read fails, then the routine proceeds to step 504, where the now exhausted file is closed. The routine then proceeds to step 505, where the file stack is popped, such that the routine may return to any previously opened file, if any exists. The routine then proceeds to step 501.

At step 506, the routine checks to see if it has reached the end of the input line, a delimiter point. If the routine has reached the end of the current input line, the routine returns to allow another context to have an equal opportunity to execute a line of input. If the line is not exhausted the routine proceeds to step 507. Step 507 extracts the next "token" from the input. In query step 508, if the token is a value (parameter), it is pushed on the evaluation stack in step 513, and the routine proceeds to step 501. If the token constitutes a command, the routine performs the command at step 509.

At query step 510, if the command is one which opens a file, the routine proceeds to step 511, where the currently open file, if any, is saved by pushing onto a "file" stack in step 511, and the new file is opened at step 512. If not, the routine loops back to step 501. After completing step 512, the routine then proceeds to step 501, to attempt to obtain the first line of input from the newly opened file. Token processing may include the execution of logic and or arithmetic functions, such that subsequently following commands may or may not be executed or may have their parameters altered to suit the local environment.

Figure 6:
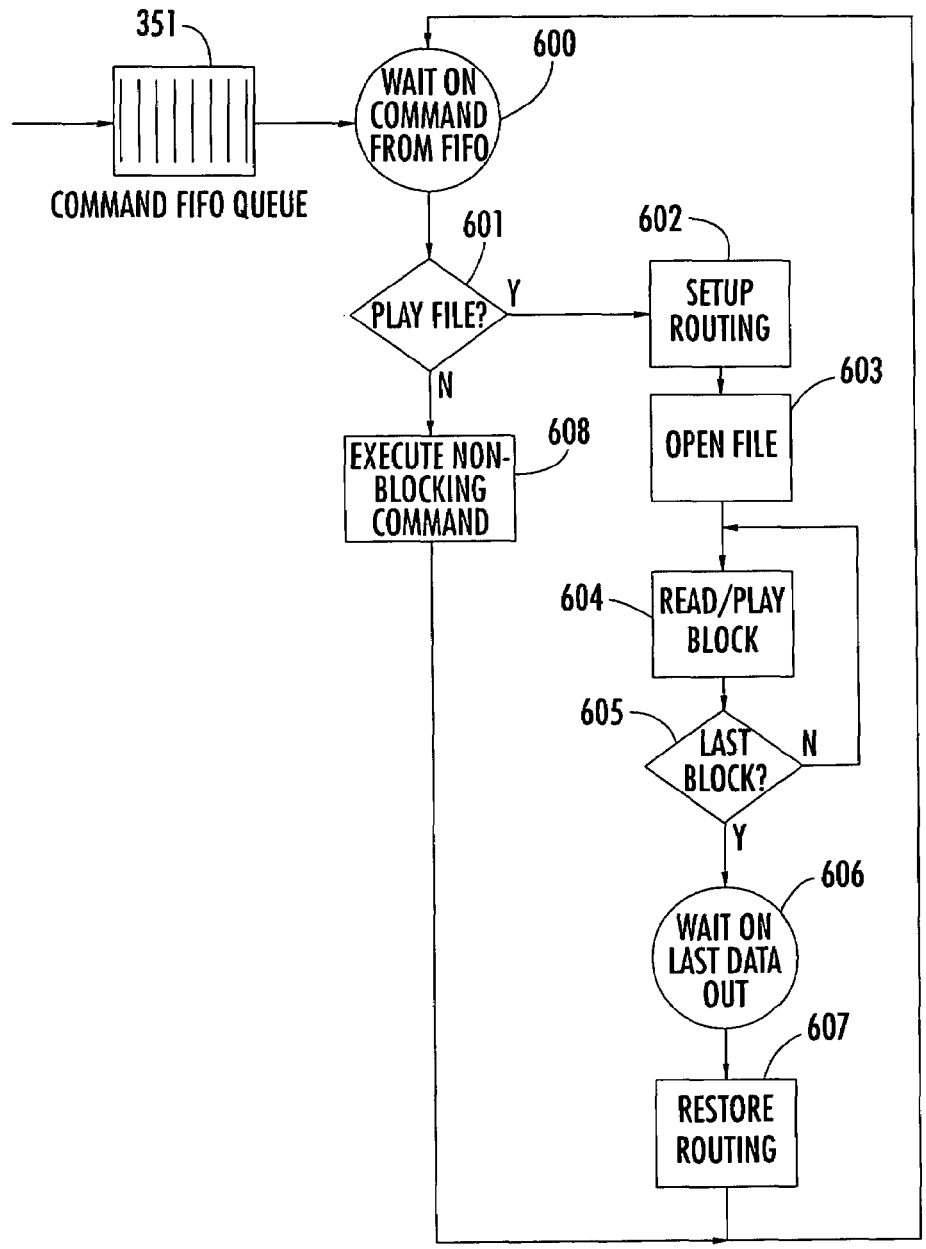
FIG. 6 is a flow chart of the routine executed by the command interpreter in association with the 'play' engine process of FIG. 3.

FIG. 6 shows a flow chart of the routine executed by the command interpreter in association with the play engine of FIG. 3. As described above, the play engine is a virtual machine which retrieves digital audio files stored in the digital storage unit and provides them to the audio decoders for delivery to an audio output port for controlled insertion or interleaving with the received real-time audio stream being received from the network headend. Parameters received with the play command determine the play engine to be used, the digital audio data rate, which decoder is to play the file, and the size of the audio file to be played (as blocks of data or an entire file).

In state 600, the play engine routine is awaiting a play command from the headend input process FIFO 351. If the command is not a file play command (the answer to an initial query step 601 is NO), the routine executes a non-blocking command in step 608 and returns to the wait state 600. However, when a 'play file' command is received (the answer to an initial query step 601 is YES), the routine transitions to step 602 which sets up a routing path for data to flow from the digital storage unit 300 to the destination decoder (one of the MPEG decoders 240, 310 in FIG. 2). The file is then opened in step 603, and in step 604, the respective blocks of data in the file are read out and played back via the destination decoding audio output path. During file readout and playback, the number of blocks in the file are counted in query step 605. Until the last block is read out, query step loops back to step 604. However, once the last block in the file has been read out (the answer to query step 605 is YES), the routine transitions to wait step 606, wherein the data continues to be streamed until the play buffer is empty. Once the play buffer is empty, the audio routing is returned to its original configuration in step 607 and the playing of the accessed audio file is complete. The routine then returns to state 600. The play engine routine then executes the next command in the headend input process queue 351 or waits until another audio file play command is presented to the command interpreter.

Figure 7:
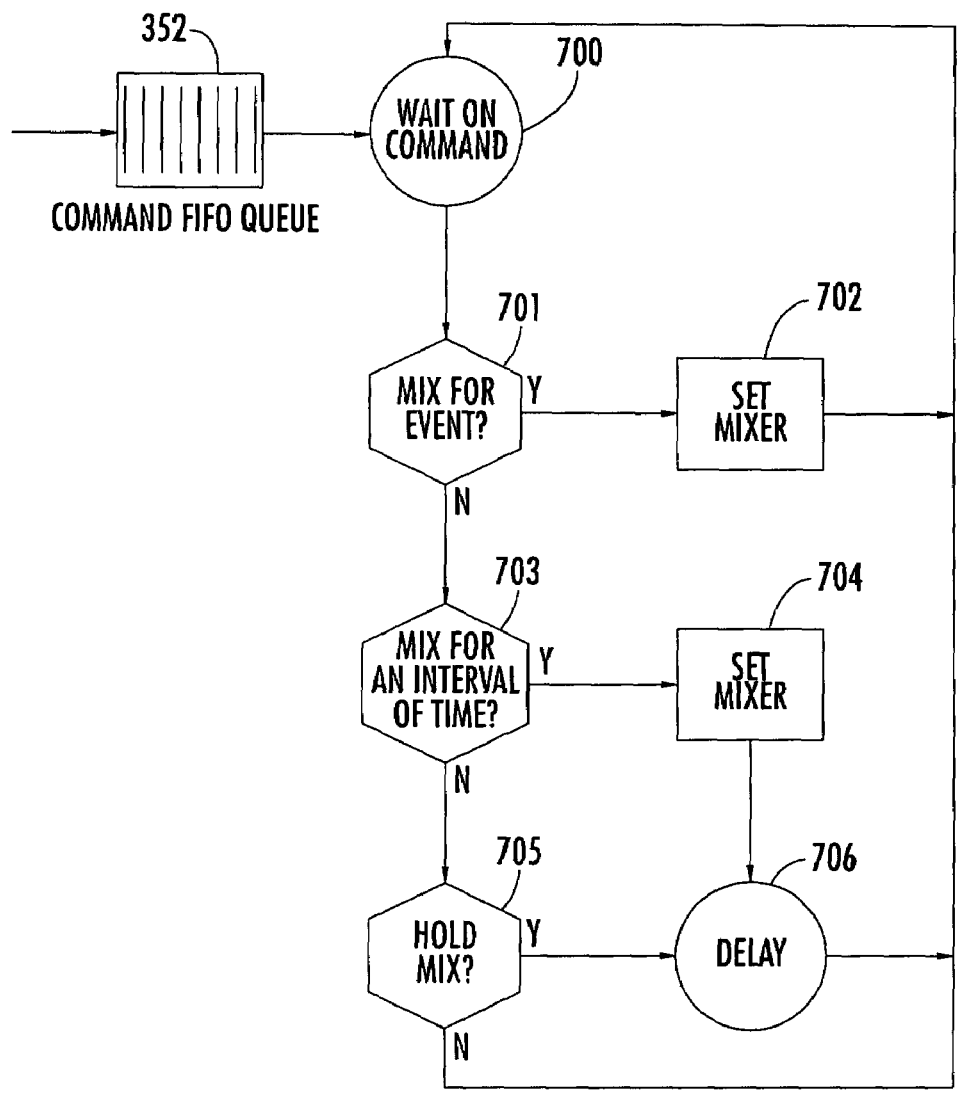
FIG. 7 is a flow chart of the routine executed by the command interpreter in association with the 'mixer' engine process of FIG. 3.

FIG. 7 shows a flow chart of the routine executed by the command interpreter in association with the mixer engine of FIG. 3. As described above, the mixing engine is used to control the operation of the 3×1 mixer 260 of FIG. 2, to provide for the controlled mixing of three audio sources: 1—the real-time audio feed as decoded by MPEG decoder 240; 2—a played back audio feed extracted via the command processor 220 from the storage unit 300 and decoded by MPG decoder 310; and 3—a local audio feed supplied by way of the auxiliary input buffer 320. The mixer command contains four parameters including relative volume for each source, and the time for the mixer to transition from its current state to a new state. Normally, the mixer will be commanded to fade from a real-time feed to a recorded file and back again. Mixer commands will normally be combined with play commands to create a 'break'. This takes advantage of the non-blocking nature of command interpreter.

As shown in the flowchart, in state 700, the mixer routine is awaiting a mix command from the script input process FIFO 352. In an initial query step 701 a determination is made as to whether the mixing operation is for an event. If the answer to query step 701 is YES, the routine sets the mixer parameters in 702 and loops back to wait step 700. If the answer to query step 701 is NO, the routine transitions to query step 703. In query step 703 a determination is made as to whether the mixing operation is for a prescribed interval of time. If the answer to query step 703 is YES, the routine sets the mixer parameters, over the time period specified in the command, in 704 and loops back to wait step 700. If the answer to query step 703 is NO, the routine transitions to query step 705. In query step 705 a determination is made as to whether the mixing parameters are to be held as is. If the answer to query step 705 is YES, the routine loops back to wait step 700 through a delay in step 706. If the answer to query step 705 is NO, the routine transitions directly to wait state 700.

Figure 8:
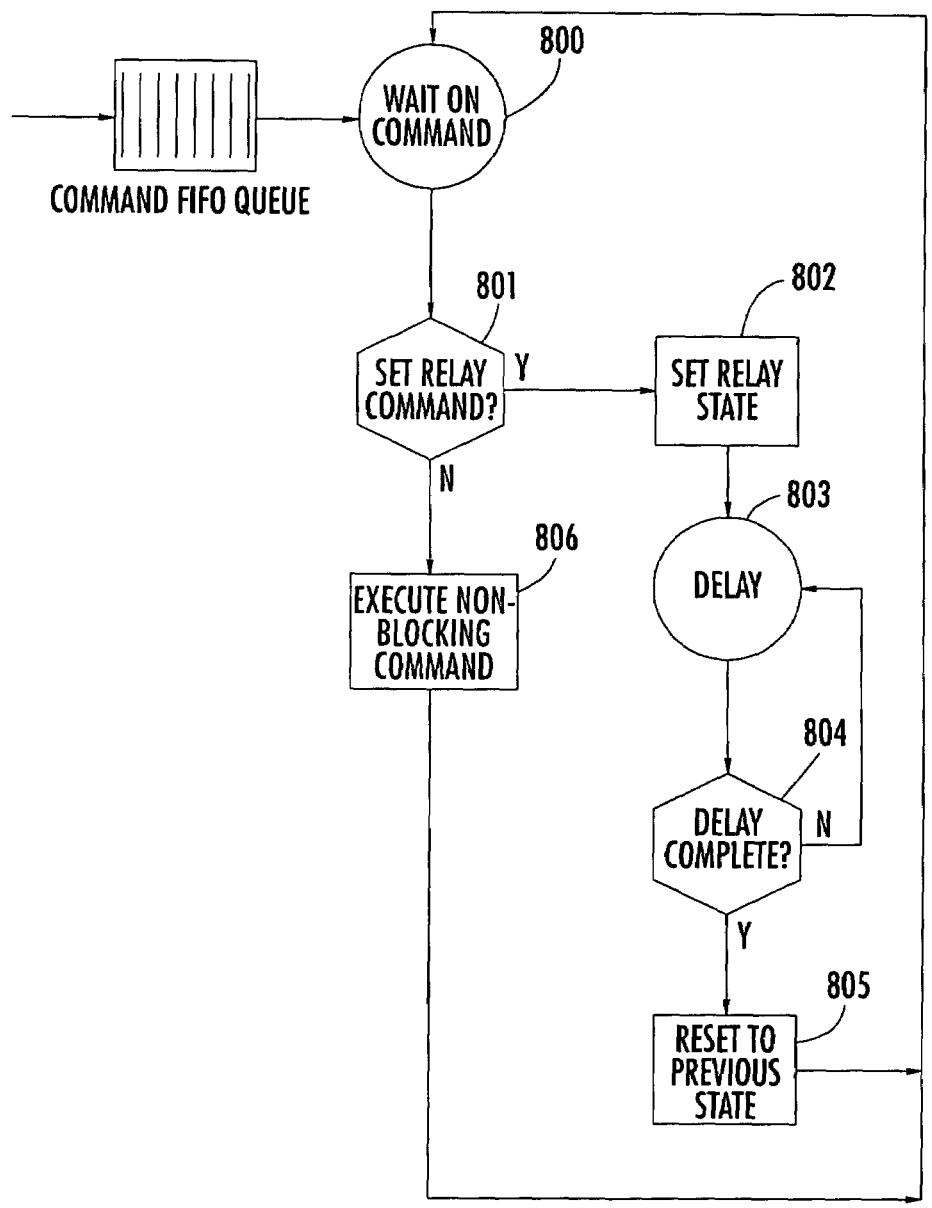
FIG. 8 is a flow chart of the routine executed by the command interpreter in association with the 'relay' engine process of FIG. 3.

FIG. 8 shows a flow chart of the routine executed by the command interpreter in association with the relay engine of FIG. 3. As described above, the relay engine is employed to selectively operate relays used to initiate local actions at the affiliate station. The signal output path of this engine is coupled to the relay closure interface 350. Relay commands may include opening, closing or pulsing a relay (closed) for a programmable time interval (after which the relay reopens).

In state 800, the relay engine routine is awaiting a relay command from a relay command FIFO. If the command is not a relay command (the answer to an initial query step 801 is NO), the relay routine executes a non-blocking command in step 806 and returns to the wait state 800. However, when a 'set relay' command is received (the answer to an initial query step 801 is YES), the relay engine routine transitions to step 802 which sets the relay state. The parameters of the relay command include (numerical) identification of the particular relay engine to be used, the state of the relay (open/closed) and the duration of operation (pulsed for a specified period of time). Once the relay state has been set in set in step 802, the routine transitions through wait step 803 to query step 804, to determine whether a prescribed time-out has elapsed. When the delay is complete (the answer to query step 804 is YES), the relay is returned to its previous state in step 805, and the routine returns to wait state 800.

Figure 9:
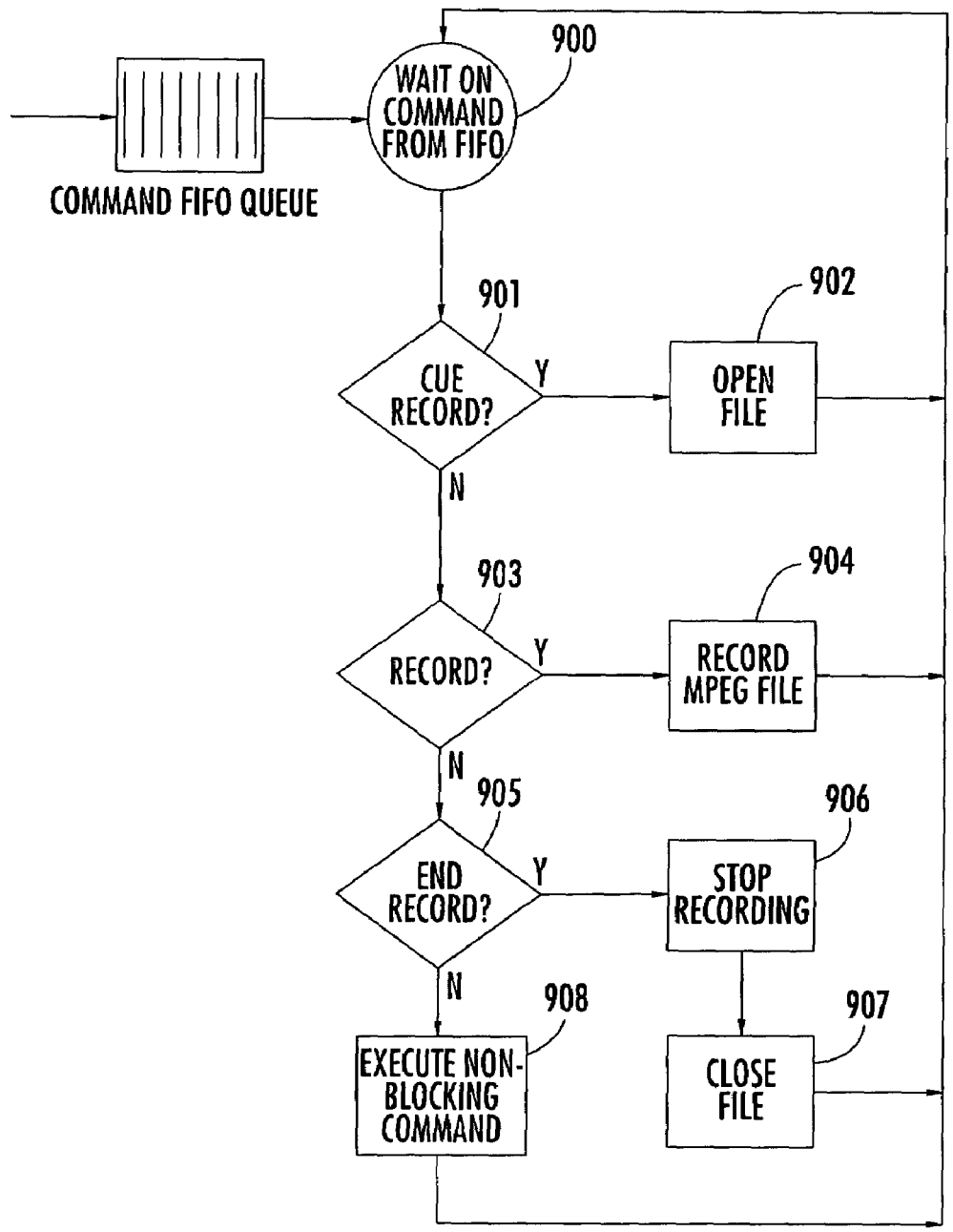
FIG. 9 is a flow chart of the record engine routine executed by the command interpreter in association with the 'record' engine process of FIG. 3.

FIG. 9 shows a flow chart of the record engine routine executed by the command interpreter in association with the record engine of FIG. 3. The record engine is used to controllably record digital audio streams as the audio is being received in real-time from the network headend. As described above, the record engine enables the affiliate station to record a short newscast or a complete program for broadcast at a later time. The end result of the record process is a digital audio file that is written into the digital storage unit and may be treated as any other stored file.

In state 900, the record play engine routine is awaiting a record command from the associated command FIFO. In an initial query step 901, the routine determines whether the command is a cue command. If the answer to query step 901 is YES, the routine transitions to step 902 and opens a file in the digital storage unit 300 which will be used to store the digital audio stream. It then transitions back to step 900. When the answer to query step 901 is NO, the routine transitions to query step 903 to determine whether the file is being recorded. When the answer to query step 903 is YES, the routine transitions to step 904 and records the incoming audio stream in an MPEG file in the digital storage unit 300 which will be used to store the digital audio stream. It then transitions back to step 900. When the answer to query step 903 is NO, the routine transitions to query step 905 to determine whether an end record command has been received. When the answer to query step 905 is YES, the routine transitions to step 906, which terminates the recording process, and closes the file in step 907. The routine then transitions back to wait step 900. If the answer to query step 905 is NO, the record routine executes a non-blocking command in step 907 and returns to the wait state 900. At the end of the recording routine, a digital audio file is stored in the storage unit, and may be accessed and played back in the same manner as a downloaded digital audio file.

As described above, a fifth output port 365 of the command interpreter is coupled to one or more output queues 375 that feed one or more auxiliary engines 395 associated with additional interfaces, such as the network interface 330 and remote command interface 340. Since these auxiliary engines are user defined and variable no explicit flow chart therefor is presented. However, from the foregoing, an output process engine may be readily tailored for the individual task using associated command read, process, loop back and non-blocking steps similar to those in the routines of the engine flow charts of FIGS. 6–9.

As will be appreciated from the foregoing description, the use of a multi-threaded command interpreter and an associated reduced complexity audio control language (ACL) to define commands therefor enables the store and forward satellite receiver architecture of the invention to be incorporated into respectively different receiver sites, each of which is individually programmable for its own local programming purposes, yet is readily controlled by a common command signal from the network headend. This allows the command interpreter of each affiliate station to respond to a single, bandwidth-conserving, headend-sourced command to produce a complex sequence of actions in accordance with commands that are already stored in an attendant digital file storage unit. As described above, the programmable actions may include the playing back of previously digitally recorded audio files, recording of real-time audio feeds, opening and closing relays, and operating audio mixers to provide for the professional sounding insertion of potentially locally specific recorded material with a real-time rebroadcast audio stream.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed is:

1. A method of controlling the operation of a plurality of transceiver stations from a master site comprising the steps of:
   (a) transmitting, from said master site to said transceiver stations, a general application information signal that is retransmitted by each of said transceiver stations;
   (b) storing, in a respective transceiver station, a sequence of commands which, when invoked, cause said respective transceiver station to perform a respective sequence of actions, including the transmission of one or more additional specific application information signals, other than said general application information signal as received from said master site and retransmitted by said respective transceiver station, and wherein the respective sequence of actions of one transceiver station is not necessarily the same as, and can be expected to be different from the respective sequence of actions of another transceiver station of said plurality of transceiver stations;
   c) transmitting, from said master site to each of said transceiver stations, a prescribed command signal; and
   (d) at said each of said transceiver stations, receiving said prescribed command signal transmitted from said master site in step c) and, in response thereto, invoking the respective sequence of commands stored in step (b), and thereby causing each respective transceiver station to perform a respective sequence of actions associated with the respective sequence of commands stored thereby,
   wherein step (b) comprises transmitting respectively different sequences of commands from said master site to respectively different ones of said transceiver stations, and conditionally storing said respectively different sequences of commands at said respectively different ones of said transceiver stations under the same command names, and wherein step (d) comprises, in response to receipt of said prescribed command signal at said respectively different ones of said transceiver stations, invoking respective sequences of commands stored in step (b), and thereby causing said respectively different ones of said transceiver stations to perform respectively different sequences of actions associated with the invoked same sequences of commands.

2. The method according to claim 1, wherein step (a) comprises broadcasting, from said master site to said transceiver stations, common commercial audio programming that is rebroadcast by each of said plurality of transceiver stations as it is received.

3. The method according to claim 2, wherein a respective sequence of commands stored at a respective transceiver station includes commands that are effective to play back respectively different information files stored at said respective transceiver station interleaved with portions of said common commercial audio programming being rebroadcast by said respective transceiver station.

4. The method according to claim 2, wherein a respective sequence of commands stored at a respective transceiver station includes commands that are effective to cause said respective transceiver station to perform a sequence of respectively different operations at given instances in time.

5. The method according to claim 1, wherein a respective sequence of commands comprises a script file whose contents are defined so as to control the operation of a respective transceiver station, including rebroadcast thereby of said common commercial audio programming, as well as additional functions, including play back of respectively different information files stored at said respective transceiver station, interleaved with portions of said common commercial audio programming being rebroadcast by said respective transceiver station.

6. The method according to claim 1, wherein step (d) further includes, at a respective transceiver station, processing one or more additional sequences of commands from one or more sources other than said master site, and causing said respective transceiver station to perform one or more additional conditional sequences of actions associated with said one or more additional sequences of commands.

7. The method according to claim 6, wherein step (d) includes sequentially polling or waiting for multiple sequences of commands coupled thereto, and causing said respective transceiver station to perform action defined by the oldest yet to be executed current command of a respectively polled or received sequence of commands, and then transition to another sequence of commands and perform action defined by the oldest yet to be executed command of said another sequence of commands, prior to causing said respective transceiver station to perform action defined by the next to the oldest yet to be executed command of said respectively polled sequence of commands.

8. A store and forward communication system comprising:
   a mater site transmitter which is operative to transmit a general application information signal to a plurality of transceiver stations, said plurality of transceiver stations being operative to receive and retransmit said general application information signal, and wherein said master site is further operative to controllably transmit a prescribed command signal to each of said transceiver stations; and
   a respective transceiver station containing a storage unit storing a sequence of commands which, when executed, cause said respective transceiver station to perform a respective sequence of actions, including the transmission of one or more additional specific application information signals, other than said general application information signal as received from said master site transmitter and retransmitted by said respective transceiver station, and wherein a respective sequence of actions of one transceiver station is not necessarily the same as, and can be expected to be different than, the respective sequence of actions of another transceiter station of said plurality of transceiver stations;
   wherein each of said transceiver stations includes a command signal processor, which is operative to access and execute a sequence of commands stored in said storage unit, in response to receipt of said prescribed command signal, and thereby cause said each respective transceiver station to perform a respective potentially locally unique sequence of actions associated with the accessed sequence of command;
   wherein said master site transmitter is operative to transmit respectively different sequences of commands to respectively different ones of said transceiver stations, and wherein storage units thereof are operative to store said respectively different sequences of commands, and wherein command signal processors of respectively different transceiver stations are operative to access and execute respective sequences of commands stored in associated storage units, and thereby cause said respectively different ones of said transceiver stations to perform respectively different sequences of actions associated with the executed sequences of commands.

9. The store and forward communication system according to claim 8, wherein said master site transmitter is operative to broadcast to said transceiver stations, common commercial audio programming that is rebroadcast by each of said plurality of transceiver stations as it is received.

10. The store and forward communication system according to claim 9, wherein a respective sequence of commands stored at a respective transceiver station includes commands that are effective to play back respectively different information files stored in the storage unit of said respective transceiver station, interleaved with or overlaid on portions of said common commercial audio programming being rebroadcast by said respective transceiver station.

11. The store and forward communication system according to claim 9, wherein a respective sequence of commands stored in a storage unit at a respective transceiver station includes commands that are effective to cause said respective transceiver station to perform a sequence of operations at different instances in time.

12. The store and forward communication system according to claim 8, wherein a respective sequence of commands comprises a script file whose contents are defined so as to control the operation of a respective transceiver station, including rebroadcast thereby of said common commercial audio programming, as well as additional functions, including play back of respectively different information files stored at said respective transceiver station, interleaved with or overlaid on portions of said common commercial audio programing being rebroadcast by said respective transceiver station.

13. The store and forward communication system according to claim 8, wherein the command signal processor of a respective transceiver station is operative to process one or more additional sequences of commands from one or more sources other than said master site, and to cause said respective transceiver station to perform one or more additional sequences of actions associated with said one or more additional sequences of commands.

14. The store and forward communication system according to claim 13, wherein the command signal processor of a respective transceiver is operative to poll or await reception of multiple sequences of commands coupled thereto, and to cause said respective transceiver station to perform action defined by the oldest yet to be executed current command of a respectively polled or received sequence of commands, and then transition to another sequence of commands and perform action defined by the oldest yet to be executed command of said another sequence of commands, prior to causing said respective transceiver station to perform action defined by the next to the oldest yet to be executed command of said respectively polled sequence of commands.

15. A store and forward receiver for use with a respective rebroadcasting station of a multistation network having a master site transmitter which transmits a general application information signal to a plurality of rebroadcasting stations, said respective rebroadcasting station being operative to receive and retransmit said general application information signal, said store and forward receiver comprising:

a demodulator which is operative to demodulate a signal transmitted to said plurality of rebroadcast stations from said master site transmitter containing said general application information signal and a control channel;

a rebroadcast signal transport path coupled to said demodulator and being operative to coupled said general application information signal to rebroadcasting equipment of said respective rebroadcasting station for rebroadcast thereby; and a command signal processor coupled to said demodulator and said rebroadcast signal transport path, and which is operative, in response to receipt of a prescribed command in said control channel of said signal transmitted from said master site transmitter to said plurality of rebroadcasting stations, to access a sequence of commands stored in a storage unit therefor, and to cause the execution of respective actions associated with said sequence of commands, including play back through said rebroadcast signal transport path of one or more auxiliary information files stored in said storage unit interleaved with portions of said general application information signal being rebroadcast by said respective transceiver;

wherein a respective sequence of commands stored in said storage unit includes commands that are effective to cause said respective rebroadcasting station to perform a sequence of operations at different instances in time.

16. The store and forward receiver according to claim 15, wherein said command signal processor is operative to access a sequence of commands stored in said storage unit, in response to receipt of a command signal from a source other than said master site transmitter.

17. The store and forward receiver according to claim 15, wherein a respective sequence of commands stored in said storage unit includes commands that are effective to cause said respective rebroadcasting station to perform a locally unique sequence of operations meeting network timing requirements at the same instance in time for receivers in that network grouping.

18. The store and forward receiver according to claim 15, wherein said general application information signal comprises a commercial programming digital audio stream, and wherein said respective actions associated with said sequence of commands include the playback of respective auxiliary information files stored in said storage unit associated with a prescribed length station break containing one or more commercial messages and at the locally specific station identification message.

\* \* \* \* \*